United States Patent [19]

Christie et al.

[11] Patent Number: 5,161,208
[45] Date of Patent: Nov. 3, 1992

[54] OPTICAL FIBER CANISTER AND PROCESS WITH OVERCOAT ADHESIVE LAYER TO PREVENT DISPENSING END BREAKS

[75] Inventors: Nancy J. Christie; Daniel K. Schotter, both of Tucson, Ariz.

[73] Assignee: Hughes Aircraft Company, Los Angeles, Calif.

[21] Appl. No.: 810,655

[22] Filed: Dec. 19, 1991

[51] Int. Cl.$^5$ .......................... G02B 6/02; F41G 7/00; B65H 18/28; B32B 31/00
[52] U.S. Cl. .................................... 385/128; 385/141; 385/147; 385/135; 244/3.12; 244/3.16; 242/170; 242/172; 242/173; 242/175; 156/166
[58] Field of Search ............... 385/128, 134, 135, 136, 385/137, 141, 147; 244/3.12, 3.16; 242/170, 171, 172, 173, 174, 175, 118.2; 156/166, 169

[56] References Cited

U.S. PATENT DOCUMENTS

| | | | |
|---|---|---|---|
| 4,950,049 | 8/1990 | Darsey et al. | 385/134 |
| 4,955,688 | 9/1990 | Chapin et al. | 385/147 |
| 4,957,344 | 9/1990 | Chesler et al. | 385/134 |
| 4,995,698 | 2/1991 | Myers | 385/134 |
| 5,029,960 | 7/1991 | Hulderman et al. | 385/134 |

*Primary Examiner*—Brian Healy
*Attorney, Agent, or Firm*—R. M. Heald; C. D. Brown; W. K. Denson-Low

[57] ABSTRACT

An optical fiber payout canister (22) comprises a bobbin (30) having a dispensing end and an optical fiber pack having a plurality of optical fiber layers (34, 36) wound upon the bobbin (30). The pack has a transition winding pattern between the optical fiber layers (34, 36) at the dispensing end thereof, and an overcoat adhesive layer overlies the transition winding pattern of the optical fiber pack. The adhesive layer desirably comprises from about 80 to about 72 parts by weight of a precatalyzed organofunctional siloxane polymer and from about 20 to about 28 parts by weight of a silicone elastoplastic resin. The adhesive layer desirably has a tensile strength of from about 25 to about 40 psi, and a modulus of elasticity of from about 1200 to about 1600 psi, over a temperature range of from about −50° C. to about +80° C.

16 Claims, 2 Drawing Sheets

OPTICAL FIBER CANISTER AND PROCESS WITH OVERCOAT ADHESIVE LAYER TO PREVENT DISPENSING END BREAKS

BACKGROUND OF THE INVENTION

This invention relates to optical fiber canisters, and, more particularly, to a technique for preventing optical fiber breakage at optical fiber winding transitions between layers.

Optical fibers are strands of glass fiber processed so that light beams transmitted therethrough are subject to total internal reflection. A large fraction of the incident intensity of light directed into the optical fiber is received at the other end of the optical fiber, even though the optical fiber may be hundreds or thousands of meters long. Optical fibers have shown great promise in communications applications, because a high density of information may be carried bidirectionally along the optical fiber and because the quality of the signal is less subject to external interferences of various types than are electrical signals carried on metallic wires. Moreover, the glass fibers are light in weight and made from a highly plentiful substance, silicon dioxide.

Glass optical fibers are typically fabricated by preparing a preform of glasses of two different optical indices of refraction, one inside the other, or a single glass composition with a coating that ensures total internal reflection, and processing the preform to a fiber by drawing, extruding, or other process. The optical fiber is coated with a polymer layer termed a buffer to protect the glass from scratching or other damage. As an example of the dimensions, in a typical configuration the diameter of the glass optical fiber is about 125 micrometers, and the diameter of the optical fiber plus the polymer buffer is about 250 micrometers (0.010 inch).

For such a very fine optical fiber, the handling of the optical fiber to avoid damage that might reduce its light transmission properties becomes an important consideration. The optical fiber is typically wound as a layer onto a cylindrical or slightly tapered cylindrical bobbin with many turns adjacent to each other in a side-by-side fashion. After one layer is complete, another layer of the optical fiber is overlaid on top of the first layer, and so on, in a back-and-forth pattern.

At the end of each layer, a transition winding arrangement termed a "step back" is used to provide a smooth transition between the end of the layer just completed, and the beginning of the next layer about to be wound. The step-back transition reduces the chances of a snarl in the optical fiber as it is dispensed or payed out from the canister. The arrangement of the wound optical fiber is termed the "fiber pack", and the final assembly of the bobbin and the fiber pack, optionally with a housing, is termed a "canister". At a later time when the optical fiber is to be used, the optical fiber is dispensed from the canister in a direction generally parallel to the axis of the bobbin. The point at which the optical fiber is separated from the optical fiber pack during payout is termed the "peel point". This peel point moves around the circumference of the bobbin as each turn of optical fiber is dispensed, and also moves forwardly or rearwardly as each layer is dispensed.

It has been found by experience that, where the optical fiber is to be payed out from the canister in a rapid fashion, the turns of optical fiber may need to be held in place on the canister with an adhesive. The adhesive holds each turn of optical fiber in place as adjacent turns and overlying layers are initially wound onto the canister, and also as adjacent turns and overlying layers are payed out. Without the use of an adhesive, payout of the optical fibers may not be uniform and regular, leading to snarls or snags of the optical fibers that damage them or cause them to break as they are payed out.

Notwithstanding the use of the adhesive, in the transition step-back region at the end of every other layer of the fiber pack at the end toward which the optical fiber is dispensed, there is a greater likelihood of the optical fiber snapping as the winding pattern changes. In these transition regions, the optical fiber winding arrangement changes from one in which the optical fiber must be lifted over adjacent turns in order to be drawn from the bobbin (the "hard payout" orientation), to one in which the optical fiber is drawn directly from the bobbin (the "easy payout" orientation). The step-back winding eases this transition, but even then there remains a greater likelihood of failure, a phenomenon termed "aft end" or "dispensing end" breaks.

There have been attempts to vary the amount of the adhesive or its method of application in the transition step-back region in order to reduce the incidence of dispensing end breaks. These attempts have not been successful. The transition step-back region continues to have a relatively higher probability of peel point failure than most other regions of the optical fiber pack.

Accordingly, there is a need for an improved approach to preventing dispensing end breaks during the dispensing of an optical fiber from a canister. The solution must be operable over the entire temperature range specified for operation of the dispensing canister. The present invention fulfills this need, and further provides related advantages.

SUMMARY OF THE INVENTION

The present invention provides an optical fiber canister structure and method for its preparation, which reduces the likelihood of optical fiber failure during dispensing of the optical fiber through the transition region between layers. The approach has been tested and found to reduce, and typically eliminate, the dispensing end breaks of the optical fiber during payout. The canister of the invention has been demonstrated to be operable at temperatures in the range of $-46$ C. to $+63$ C., with dispensing rates of as high as 244 meters per second. The approach of the invention adds virtually no weight to the canister, and is readily utilized in conjunction with existing optical fiber pack winding apparatus.

In accordance with the invention, an optical fiber payout canister comprises a bobbin having a dispensing end, and an optical fiber pack having a plurality of optical fiber layers wound upon the bobbin. The pack has a transition winding pattern between the optical fiber layers at the dispensing end thereof, and an overcoat adhesive layer overlies the transition winding pattern of the optical fiber pack. The adhesive layer comprises from about 80 to about 72 parts by weight of a precatalyzed organofunctional siloxane polymer and from about 20 to about 28 parts by weight of a silicone elastoplastic resin. The adhesive layer desirably has a tensile strength of from about 25 pounds per square inch (psi) to about 40 psi, and an elongation to failure of from about 8 percent to about 16 percent at 25 C.

The overcoat adhesive material deposited over the transition windings has the proper combination of mechanical properties to reduce the occurrence of dispensing end fiber breaks. This combination of properties is retained over the range of operation of the canister, as required by typical specifications. Thus, the canister of the invention has increased reliability during payout operations, an important advance in this art. Other features and advantages of the invention will be apparent from the following more detailed description of the invention, taken in conjunction with the accompanying drawings, which illustrate, by way of example, the principles of the invention.

DETAILED DESCRIPTION OF THE INVENTION

Figure 1:
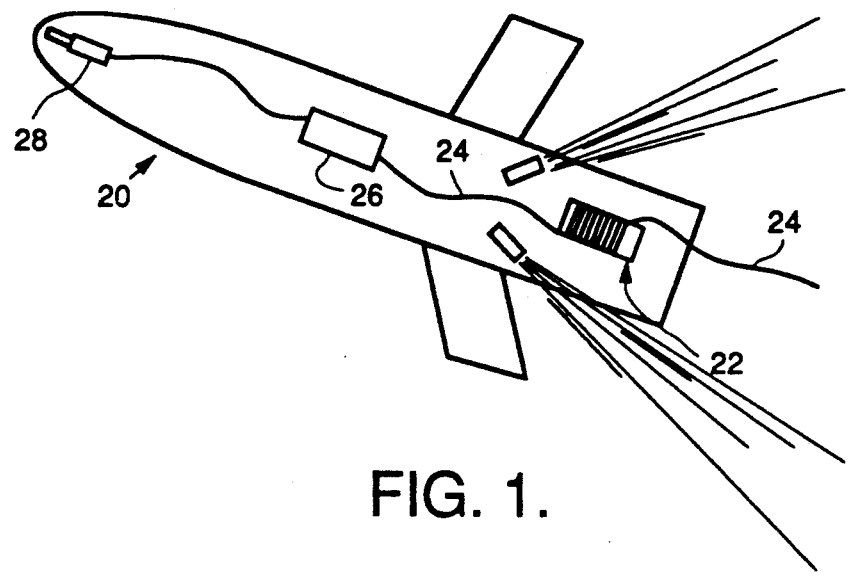
FIG. 1 is a schematic internal view of a missile with an optical fiber canister therein, during dispensing of the optical fiber.

FIG. 1 illustrates a missile 20 having an optical fiber canister 22 mounted in its tail. An optical fiber 24 is dispensed from the canister 22. As the missile 20 flies, the optical fiber 24 is continuously payed out from the canister 22. The dispensed end of the optical fiber 24 extends rearwardly from the missile 20 to a base (not shown). The retained end is connected to a processor unit 26, which receives signals from a sensor 28. Sensor and performance data is transmitted over the optical fiber data link from the processor unit 26 to the base, and commands are transmitted over the optical fiber data link from the base to the processor unit 26.

Figure 2:
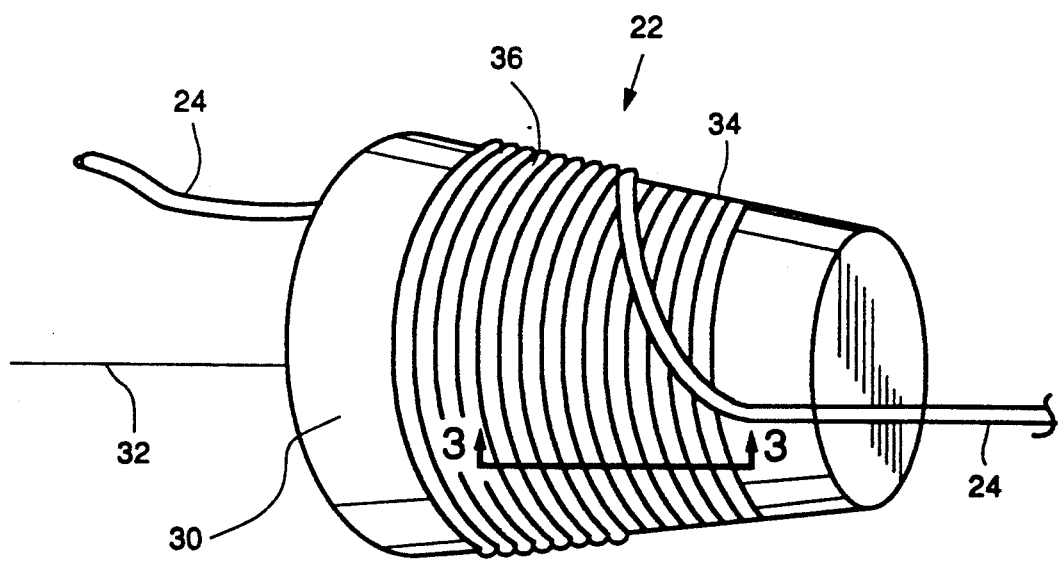
FIG. 2 is a detail of the illustration of FIG. 1, depicting the optical fiber canister in greater detail.

The canister 22 is shown in greater detail in FIG. 2. The canister 22 includes a bobbin 30, which is a cylinder or a slightly tapered cylinder having a taper angle of less than about 5 degrees. In either case, the bobbin 30 may be described as having a cylindrical axis 32. The optical fiber 24 is dispensed in a direction generally parallel to the cylindrical axis 32.

The optical fiber 24 is initially wound circumferentially around the bobbin 30 in a side-by-side fashion to form layers, with succeeding layers being wound upon the preceding layers. In FIG. 2, a first layer 34 is wound upon the bobbin 30, and then a second layer 36 is wound upon the first layer 34. In practice, there may be tens or even hundreds of layers wound upon the bobbin in this manner, with all but the bottom layer overlying those wound below it. In the view of FIG. 2, the second layer 36 is being dispensed, the overlying layers having already been payed out from the canister. When the second layer 36 is fully dispensed, then the first layer 34 is dispensed. When the optical fiber of the first layer 34 is fully payed out, then the underlying layers are dispensed.

Figure 3:
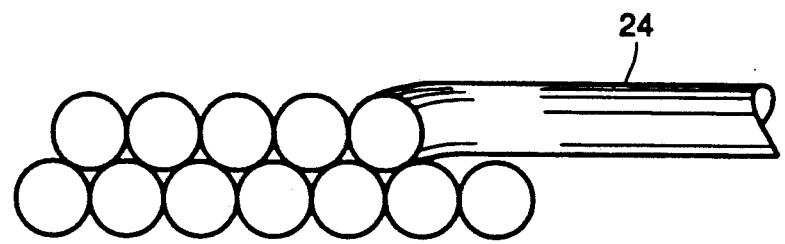
FIG. 3 is a sectional view of the canister of FIG. 2, taken along line 3—3, illustrating payout from a layer in the easy payout orientation.
Figure 4:
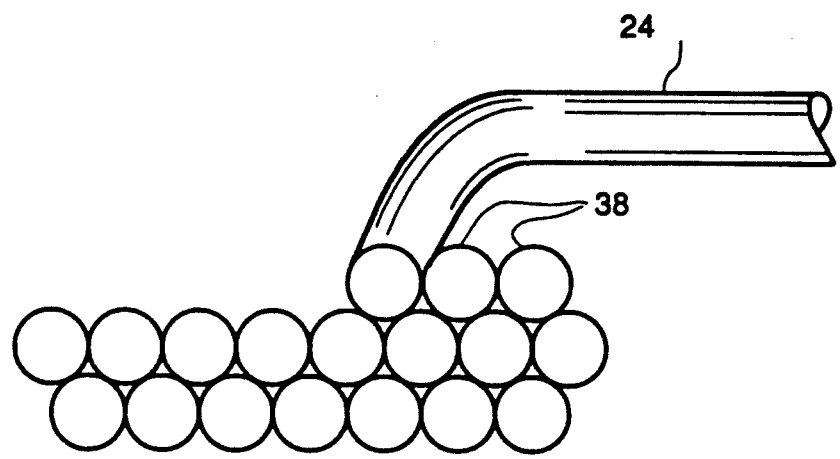
FIG. 4 is a sectional view like that of FIG. 3, illustrating payout from a layer in the hard payout orientation.

As the optical fiber 24 is payed out, towards the right in the views of FIGS. 1-4, a layer can be removed toward the left as in FIG. 3, or toward the right as in FIG. 4. As shown in FIG. 3, as the layer is removed in a direction away from the payout direction, the optical fiber 24 is dispensed without having to rise above adjacent turns of the same layer. But, as shown in FIG. 4, as the layer is removed in a direction toward the payout direction, the optical fiber 24 must elevate above adjacent turns 38. The difference in the dynamics of these two dispensing regimes cause different behavior between the easy payout direction, FIG. 3, and the hard payout direction, FIG. 4.

Figure 5:
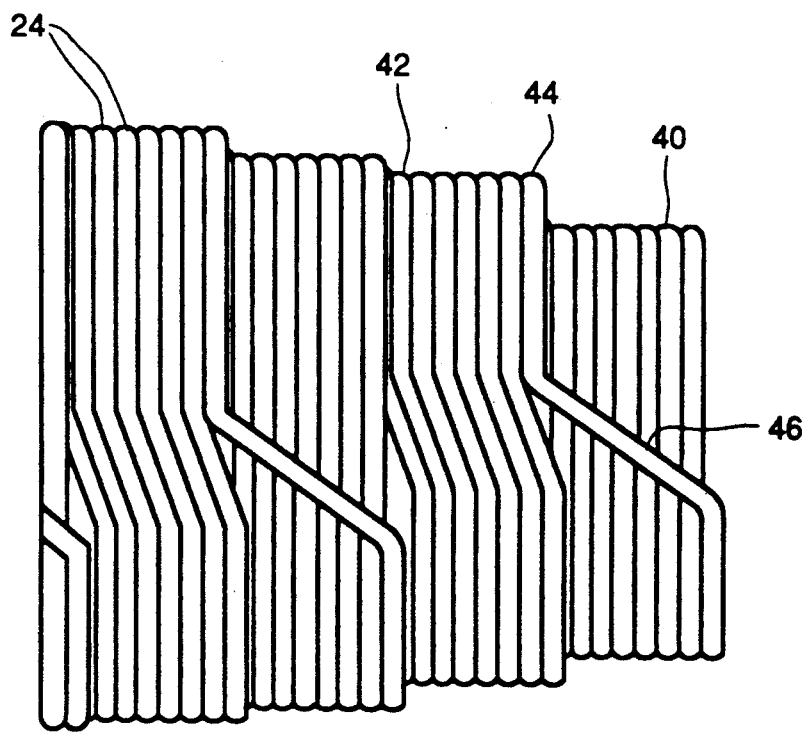
FIG. 5 is an elevational view of the step-back transitional winding between adjacent layers.

These differences also have been observed to cause payout irregularities at the ends of layers, resulting in adoption of an approach as depicted in FIG. 5. This figure illustrates in detail a transitional "step back" approach used at the end of each layer. At the completion of winding each layer, the just-completed layer is sprayed with a winding adhesive to aid in holding the turns of optical fiber in place as the next layer is added. Alternatively, adhesive may be coated directly onto the optical fiber as it is being wound onto the bobbin. Then the direction of movement to the cylindrical axis 32 is reversed, so that the next layer of optical fiber 24 can be deposited overlying the previously deposited layer. In FIG. 5, a layer 40 is wound from left to right. At the completion of the layer 40 (and after spraying the layer 40 with winding adhesive), a layer 42 is wound from right to left overlying the layer 40. The rightmost turn 44 of the second layer 42 does not commence exactly at the rightmost end of the first layer 40, but instead is stepped back by several turns with a transitional region of optical fiber 46. Such a step back approach in winding provides a more stable fiber pack geometry and reduces the likelihood of snarls developing when the optical fiber 24 is later dispensed from the bobbin 32 with the layer 42 unwound before the layer 40.

Although this winding approach reduces the likelihood of snarls, it does increase the likelihood of breakage of the optical fiber in the transition region 46. In an attempt to alleviate this problem, fabricators of canisters have sprayed the transition region 46 with the winding adhesive. However, experience has shown that the presence of a layer of the winding adhesive does not prevent optical fiber breaks in the transition step-back region 46.

In accordance with the present invention, a new formulation of adhesive, termed a "transition adhesive", has been developed. In its preferred embodiment, this formulation is a mixture of two previously available adhesive materials. The first is a silicone elastoplastic resin, available from Dow Corning Corporation as Dow Corning 1-2577 Conformal Coating. This material is typically used as a coating for circuit boards. When this material is used by itself as the transition adhesive, it is too hard and brittle, and tends to exacerbate the breakage problem in the transition region 46. The second material is a precatalyzed organofunctional siloxane polymer, available from Dow Corning as Syl-Off 7600 Coating. This material is typcially used as a potting compound in electronics manufacture. When this material is used by itself as the transition adhesive, it has insufficient strength and physical integrity to have any significant effect.

A properly formulated mixture of these two adhesives produces a transition adhesive that surprisingly achieves excellent control of the optical fiber payout in the transition region 46, preventing fiber breakage over a wide operating temperature range and at high payout speeds. The formulation that achieves these results has a composition of from about 80 to about 72 parts by weight of the 7600 adhesive, and from about 20 to about 28 parts by weight of the 1-2577 adhesive. If the mixture has too much of the 1-2577 adhesive, it is too hard and brittle, and has too wide a temperature variation in properties. If the mixture has too much of the 7600 adhesive, it is too soft and crumbly, and lacks the physical integrity to perform in a satisfactory manner. Most preferably, the formulation has about 22 parts by weight of the 1-2577 adhesive and about 78 parts by weight of the 7600 adhesive.

To prepare the transition adhesive for application by spraying, the following formulation is prepared: 20 grams of the 7600 adhesive, 1 gram of the catalyst for the 7600 adhesive (which is a reactive siloxane polymer available from Dow Corning as Syl-Off Crosslinker, 5.8 grams of 1-2577, and 5 milliliters of 1,1,1 trichloroethane to adjust the fluidity of the mixture. The adhesive is applied by spraying at a rate of about 0.15 milliliters per square inch in the transition region at the ends of layers, but not elsewhere. The coating of transition adhesive is from about 0.0005 to about 0.005 inches thick, and provides abrasion protection for the optical fiber of the transition region. The transition adhesive cures at ambient temperature in about 12 hours or in about 2 hours at 70 C.

The transition adhesive may be applied by spraying, brushing, dipping, or other operable technique, but spraying is preferred. The preferred formulation remains the same for others methods of application, except that the fluidity may be adjusted as desired by using different amounts of 1,1,1 trichloroethane or other organic liquid. The 1,1,1 trichloroethane is evaporated after the adhesive is deposited.

The transition adhesive of the invention is operable because of its optimun physical properties. It has been discovered that these properties must produce the proper combination of strength and release, which properties must be retained over the entire temperature range of interest. Specifications requiere that the optical fiber canister be operable over a temperature range, typically −32 C. to +63 C., but higher or lower temperatures may be required for particular applications. It has been discovered that the transition adhesive must have a tensile strength of from about 25 to about 40 psi, and a modulus of elasticity of from about 1200 to about 1600 psi, over the required temperature range which is in most cases within the range of from about −50 C. to about +80 C. It is difficult for most adhesive materials to meet the latter requirement of a relatively small variation in modulus of elasticity over a broad range of temperature, but it has been found that the transition adhesive of the invention has such properties over a range of from about −50 C. to about +80 C. The physical properties can also be expressed in terms of an elongation to failure of the adhesive of from about 8 to about 16 percent at 25 C. The preferred mixture of 1-2577 and 7600 resins, when cured, meets these requirements. Other formulations meeting this properties requirement are also operable.

To comparatively test the performance of the transitional adhesive of the invention, a number of substantially identical optical fiber canisters were prepared with transition step-back arrangements as discussed previously and tested with payout speeds of 224 meters per second. Some canisters were prepared using only a winding adhesive (without using the transitional adhesive), while others where prepared using both a winding adhesive and the preferred formulation and application approach for the transition adhesive discussed previously. Five canisters prepared without transition adhesive were tested at −46 C. In the each case the optical fiber broke in the transition region during payout. Five canisters prepared using the transition adhesive were tested at −46 C. In each case the optical fiber payed out successfully, and did not break. additionally, a canister prepared with the transition adhesive was tested at +64 C., and successful payout without breakage of the optical fiber was achieved.

The present invention therefore provides an advance in the art of optical fiber canisters for use in high-speed payout applications. It reduces the occurrence of optical fiber breakage in the transitional step-back region, without adding to the weight and cost of the canister. Although a particular embodiment of the invention has been described in detail for purposes of illustration, various modifications may be made without departing from the spirit and scope of the invention. Accordingly, the invention is not to be limited except as by appended claims.

What is claimed is:

1. An optical fiber payout canister, comprising:
   a bobbin having a dispensing end;
   an optical fiber pack having a plurality of optical fiber layers wound upon the bobbin, the pack having a transition winding pattern between the optical fiber layers at the dispensing end thereof; and
   an overcoat transition adhesive layer overlying the transition winding pattern of the optical fiber pack, the transition adhesive layer comprising from about 80 to about 72 parts by weight of a precatalyzed organofunctional siloxane polymer and from about 20 to about 28 parts by weight of a silicone elastoplastic resin.

2. The optical fiber payout canister of claim 1, wherein the thickness of the adhesive layer is from about 0.0005 to about 0.005 inch.

3. The optical fiber payout canister of claim 1, wherein the adhesive layer comprises about 78 parts by weight of the precatalyzed organofunctional siloxane polymer and about 22 parts by weight of the silicone elastoplastic resin.

4. The optical fiber payout canister of claim 1, wherein the transition winding pattern is a step-back pattern.

5. An optical fiber payout canister, comprising:
   a bobbin having a dispensing end;
   an optical fiber pack having a plurality of optical fiber layers wound upon the bobbin, the pack having a transition winding pattern between the optical fiber layers at the dispensing end thereof: and
   an overcoat transition adhesive layer overlying the transition winding pattern of the optical fiber pack, the transition adhesive layer having a tensile strength of from about 25 to about 40 pounds per square inch, and a modulus of elasticity of from about 1200 to about 1600 pounds per square inch, over a temperature range of from about −50 C. to about +80 C.

6. The optical fiber payout canister of claim 5, wherein the thickness of the adhesive layer is from about 0.0005 to about 0.005 inch.

7. The optical fiber payout canister of claim 5, wherein the transition winding pattern is a step-back pattern.

8. The optical fiber payout canister of claim 5, wherein the transition adhesive is a mixture of a precatalyzed organofunctional siloxane polymer and a silicone elastoplastic resin.

9. The optical fiber payout canister of claim 5, wherein the transition adhesive has a composition of from about 80 to about 72 parts by weight of a precatalyzed organofunctional siloxane polymer and from about 20 to about 28 parts by weight of a silicone elastoplastic resin.

10. The optical fiber payout canister of claim 5, wherein the transition adhesive has a composition of about 78 parts by weight of a precatalyzed organofunctional siloxane polymer and about 22 parts by weight of a silicone elastoplastic resin.

11. A process for preparing an optical fiber payout canister, comprising the steps of:
   providing a bobbin having a dispensing end;
   winding an optical fiber pack having a plurality of optical fiber layers upon the bobbin, the pack having a transition winding pattern between the optical fiber layers at the dispensing end thereof; and
   applying an overcoat transition adhesive layer having a tensile strenght of from about 25 to about 40 pounds per square inch, and a modulus of elasticity of from about 1200 to about 1600 pounds per square inch, over a temperature range of from about −50° C. to about +80° C. overlying the transition winding pattern of the optical fiber pack to prevent breakage of the optical fiber during payout.

12. The process of claim 11, wherein the transition adhesive layer comprises from about 80 to about 72 parts by weight of a precatalyzed organofunctional siloxane polymer and from about 20 to about 28 parts by weight of a silicone elastoplastic resin.

13. The process of claim 11, wherein the transition adhesive layer comprises about 78 parts by weight of the precatalyzed organofunctional siloxane polymer and about 22 parts by weight of the silicone elastoplastic resin.

14. The process of claim 11, wherein the thickness of the adhesive layer is from about 0.0005 to about 0.005 inch.

15. The process of claim 11, wherein the transition winding pattern is a step-back pattern.

16. A process for preparing an optical fiber payout canister, comprising the steps of:
   providing a bobbin having a dispensing end;
   winding a length of optical fiber onto the bobbin to form an optical fiber pack having a plurality of layers with a transition winding pattern of optical fiber extending between over-lapping portions of optical fiber layers located at the dispensing end of the bobbin;
   applying a layer of winding adhesive over at least a portion of each layer of optical fiber after it is wound on the bobbin; and
   applying a different, overcoat layer of transition adhesive over only the transition winding pattern of optical fiber to prevent fiber breakage during high speed payout.

* * * * *

UNITED STATES PATENT AND TRADEMARK OFFICE
CERTIFICATE OF CORRECTION

PATENT NO. : 5,161,208
DATED : November 3, 1992
INVENTOR(S) : N.J. CHRISTIE and D.K. SCHOTTER It is certified that error appears in the above-identified patent and that said Letters Patent is hereby corrected as shown below:

Column 1, line 28, replace "totat" with the word -- total --.

Column 5, line 28, replace "others" with the word -- other --.

line 38, replace "requiere" with the word -- require --.

line 66, replace "where" with the word -- were --.

Column 6, line 6, replace "additionally" with -- Additionally --.

Signed and Sealed this

Second Day of November, 1993

Attest:

BRUCE LEHMAN

Attesting Officer

Commissioner of Patents and Trademarks